Jan. 5, 1960

J. B. SPELLER 2,920,279

UNITY GAIN AMPLIFIER

Filed June 10, 1954

INVENTOR.
JACK B. SPELLER
BY Henry L. Shenier
ATTORNEY

United States Patent Office 2,920,279

Patented Jan. 5, 1960

2,920,279

UNITY GAIN AMPLIFIER

Jack B. Speller, White Plains, N.Y., assignor, by mesne assignments, to United Aircraft Corporation, East Hartford, Conn., a corporation of Delaware Application June 10, 1954, Serial No. 435,764

4 Claims. (Cl. 330—70)

My invention relates to a unity gain amplifier and more particularly to an amplifier circuit in which the ratio of the output voltage to the input voltage is very nearly one.

In many instances it is desirable that an amplifier have a gain which is substantially unity. Such an amplifier may be employed as an isolater for reducing the reaction of one electrical circuit or part of a circuit on another electrical circuit. It may be used in a linear sweep generator to provide an extremely accurate saw tooth.

In order to provide an amplifier circuit having a gain which is substantially unity, it is necessary that the output voltage from the circuit be very nearly equal to the input voltage. Since the characteristic curves of amplifier tubes are somewhat curved, nonlinearity is present to some extent in amplifier circuits of the prior art. This nonlinearity is particularly evident when the amplitude of the input signal is large. Consequently, the output voltage in such circuits is not equal to the input voltage, and it is not possible to provide a single tube amplifier having a gain of unity. Attempts have been made in the prior art to compensate for this nonlinearity by varying the grid bias proportionally to the distortion in the nonlinear regions of the curves. Such attempts have not been successful, since the nonlinearity is unpredictable and extremely difficult to compensate.

I have invented an amplifier circuit in which the output voltage is substantially equal to the input voltage so that the gain of the circuit is very nearly one. My circuit substantially eliminates distortion resulting from nonlinear tube characteristics even though the amplitude of the grid signal be comparatively large.

One object of my invention is to provide a unity gain amplifier in which the ratio of the output voltage to the input voltage is very nearly one.

A further object of my invention is to provide an amplifier circuit in which the operating conditions of a tube are maintained substantially constant.

Yet another object of my invention is to provide a unity gain amplifier in which distortion resulting from the nonlinearity of the chartceristic curves of the tubes employed therein is substantially eliminated.

Other and further objects of my invention will appear from the following description.

In general, my invention contemplates the provision of a thermionic amplifier tube connected to operate as a cathode follower. In the plate circuit of the tube I dispose a plurality of constant voltage devices to maintain the plate voltage of the cathode follower constant. I arrange a plurality of constant current devices such as tubes in the cathode circuit of the thermionic tube so that the plate current of the thermionic tube connected as the cathode follower is maintained constant. It will be appreciated that since the plate current and the plate voltage of the tube are constant, the amplifier will operate substantially at one point on the load line drawn on the characteristic curves. This will be true irrespective of the magnitude of the grid voltage within wide limits. A change in the input grid signal voltage ordinarily tends to cause a change in the plate current and plate voltage of a cathode follower tube. The constant current tubes in my cathode circuit ensure that the plate current does not change appreciably and the constant voltage tubes in the plate circuit ensure that the plate voltage remains substantially constant. The arrangement is such, however, that incremental changes in the input grid voltage are reflected at the cathode of my cathode follower tube. The result of this operation is an output voltage which is substantially the same as the input voltage.

I have provided my circuit with means for compensating for variations in cathode emission. My circuit may operate either as a direct current or as an alternating current amplifier with a gain which is very nearly one.

In the accompanying drawings which form part of the instant specification and which are to be read in conjunction therewith and in which like reference numerals are used to indicate like parts in the various views.

Figure 2:
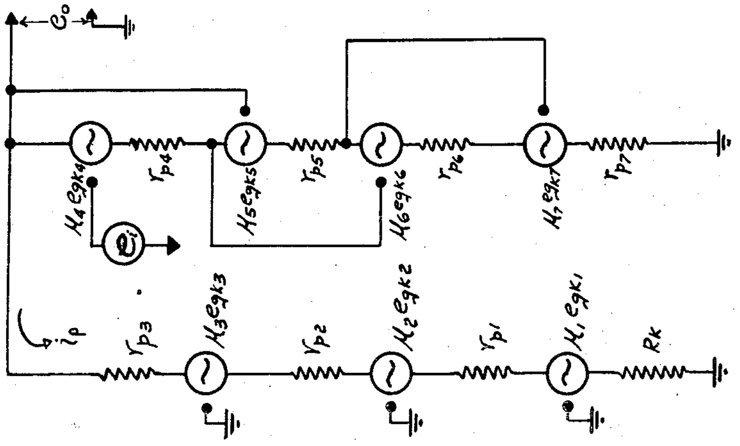
Figure 2 is a schematic view of the equivalent circuit for the varying components of my unity gain amplifier.

More particularly referring now to the drawings, I provide an amplifier tube 10 connected to operate as a cathode follower. The control grid 12 of the tube 10 is fed with an input signal from the brush 14 of a potentiometer 16. A pair of triodes 18 and 20 are connected as diodes in series across the potentiometer 16. The cathode 22 of the tube 18 is connected to one of the input terminals 24 of the circuit. The other input terminal 26 is connected to ground. The grid 28 of tube 18 is connected to the plate 30 of the tube 18. It can be seen that plate 30 is also conected to the cathode 32 of tube 20. Grid 34 and plate 36 of tube 20 are connected. The circuit including tubes 18 and 20 develops a voltage across the potentiometer 16 which is proportional to the cathode emission of all the tubes in the amplifier circuit as will be explained in detail hereinafter. It will be appreciated that this circuit including tubes 18 and 20 forms a means for compensating the amplifier for variations in cathode emission.

In order to maintain the plate current drawn by the tube 10 constant, I arrange a number of constant current tubes 38, 40, and 42 in the cathode circuit of the tube 10. While I have shown them as triodes, the tubes 38, 40 and 42, which are series-connected between the cathode 44 of the tube 10 and a resistor 46, may advantageously be pentodes. Plate 48 of tube 38 is connected to cathode 44, the cathode 50 of the tube 38 is connected to the plate 52 of tube 40, the cathode 54 of tube 40 is connected to the plate 56 of tube 42, and the cathode 58 of tube 42 is connected to resistor 46. Resistor 46 is connected to an appropriate negative battery terminal 60. In order to maintain the sum of the voltage across resistor 46 and the grid-to-cathode voltage of tube 42 constant, I connect a voltage regulator device such as a cold cathode glow tube 62 between terminal 60 and the grid 64 of the tube 42. The voltage drop across the cold cathode glow tube remains constant within certain ranges of direct current flow through the tube as is well known in the art. I connect a second cold cathode glow tube 66 between the plate 68 of the tube 62 and the grid 70 of tube 38. A voltage divider including a pair of series-connected resistors 72 and 74 provides the bias for grid 76. The tubes 62 and 66 and the voltage divider including resistors 72 and 74 function to maintain the voltages between the respective grids 70 and 76 and the terminal 60 constant. A resistor 78 connected between the plate 80 of tube 66 and ground provides a means for determining the current drawn by tubes 62 and 66.

It will readily be appreciated that the arrangement thus far described maintains the current drawn by tube 10 constant. It will be remembered that tube 62 maintains the sum $e_g$ of the voltage $e_k$ across resistor 46 and the grid-to-cathode voltage $e_{gk1}$ of tube 42 constant. Assuming a slight increase in the current drawn by tube 10, the voltage $e_k$ rises. Since $e_g$, the sum of $e_k + e_{gk1}$ is maintained constant, a rise in $e_k$ must result in a decrease of $e_{gk1}$. A decrease in the grid-to-cathode voltage of tube 42 limits the current which can be drawn by the tube so that the plate current drawn by tube 10 is decreased by an amount corresponding to the current rise initiated by the change in the input grid signal applied to grid 12. The tubes 38 and 40 function in a manner similar to tube 42. An increase in current drawn by tube 10 results in a corresponding increase in the potentials of cathodes 50 and 54 with the result that the plate current is prevented from increasing materially. It will be appreciated, therefore, that the cathode circuit provided for tube 10 ensures that the plate current drawn by tube 10 remains substantially constant, since a tendency to increase plate current of tube 10 will produce an increase in the effective resistance in the cathode circuit.

In order to maintain the plate voltage of tube 10 constant, I dispose a number of constant voltage tubes 82, 84, and 86 in the plate circuit of the tube 10. Tubes 82, 84, and 86 are series-connected between the plate 88 of tube 10 and an appropriate positive battery terminal 90. That is, the cathode 92 of tube 82 is connected to plate 88, the plate 94 of tube 82 is connected to the cathode 96 of tube 84, the plate 98 of tube 84 is connected to the cathode 100 of tube 86, and the plate 102 of tube 86 is connected to the battery terminal 90. In order to provide a bias for the grid 104 of tube 82, I connect a battery 106 between the cathode 44 of tube 10 and grid 104. A battery 108 connected between the cathode 92 of tube 82 and the grid 110 of tube 84 provides a bias for grid 110. A battery 112 connected between cathode 96 and grid 114 of tube 86 provides a bias for the grid 114. The screen grid 116 of tube 10 is connected to the grid 104 of tube 82 and the suppressor grid 118 of tube 10 is returned to cathode 44 as is conventional. The cathode 44 of tube 10 is connected to a first output terminal 120 of the amplifier. The other output terminal 122 is connected to ground.

The constant voltage tubes 82, 84, and 86 maintain the plate-to-cathode potential of tube 10 substantially constant. Assuming a slight decrease in the plate-to-cathode voltage of tube 10 resulting from an incremental increase in the input signal to control grid 12, the following sequences occur. First the voltage at cathode 44 rises. The channel including battery 106 impresses an equal increment of voltage upon grid 104 causing voltage at cathode 92 to increase a corresponding amount. Since plate 88 is at the voltage of cathode 92 owing to the direct connection, it will be seen that a variation of grid potential from an input signal does not cause a substantial change in the plate-to-cathode potential of tube 10. That is, a slight change in the plate-to-cathode voltage of tube 10 resulting from an incremental change in the input signal to control grid 12 causes a change in potential of the respective cathodes 92 and 96. The respective channels including battery 108 and battery 112 impress incremental changes in voltage corresponding to said cathode potential changes on the grids 110 and 114 to cause the potentials at the respective cathodes 96 and 100 to change. These changes in potential of cathodes 96 and 100 are in a direction to maintain the plate-to-cathode potential of tube 10 constant.

It will be seen from the circuits heretofore described that the operating conditions of the tube 10 are maintained constant. The tube 10 operates substantially at a single point on the load line drawn on the tube characteristics whereby the amplification of the tube 10 is substantially unity.

I have discovered that the operation of tube 10 may be affected by variations in cathode emission resulting from changes in filament voltage. I connect the filaments of all my tubes including the tubes 18 and 20 to the same source of electrical energy, so that every tube is affected to the same extent by a variation in filament voltage. If a variation in cathode emission resulting from a change in filament voltage occurs, a potential difference exists between each of the plates 30 and 36 and the respective cathodes 22 and 32. As a consequence, the tubes pass a plate current which is proportional to the variation in emission. This plate current passes through voltage divider 16. The arrangement is such that the voltage across divider 16 resulting from this plate current increases or decreases the input signal depending on the direction of change in cathode emission. The resultant potential on grid 12 is thus varied to compensate for the effect of variations in cathode emission of all tubes of the circuit.

Figure 1:
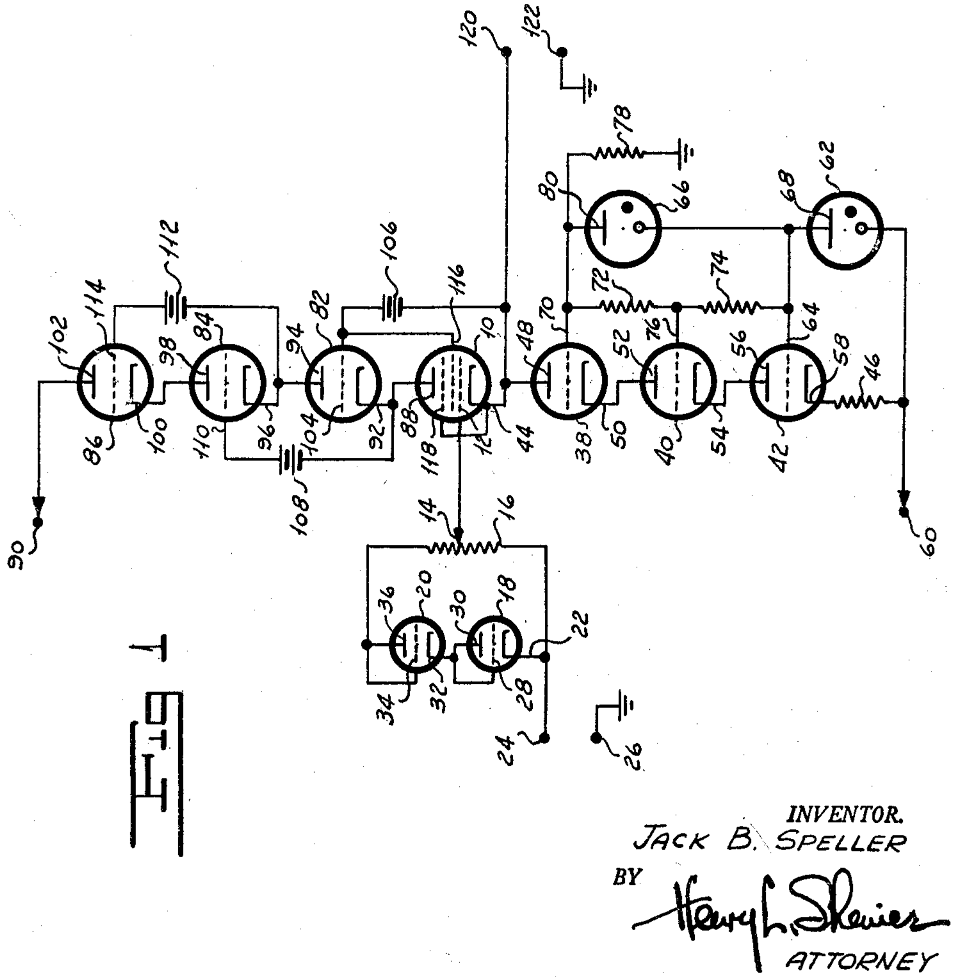
Figure 1 is a schematic view of my unity gain amplifier.

In Figure 2 I have illustrated the equivalent circuit for the varying components of the unity gain amplifier shown in Figure 1. In the equivalent circuit the resistor 46 is designated by the character $R_k$ and the respective tubes 42, 40, 38, 10, 82, 84, and 86 are represented as generators generating the respective voltages $u_1e_{gk1}$, $u_2e_{gk2}$, $u_3e_{gk3}$, $u_4e_{gk4}$, $u_5e_{gk5}$, $u_6e_{gk6}$, $u_7e_{gk7}$, and having respective internal resistances $r_{p1}$, $r_{p2}$, $r_{p3}$, $r_{p4}$, $r_{p5}$, $r_{p6}$ and $r_{p7}$. From this equivalent circuit the general equation of my unity amplifier may be determined. Further it may be demonstrated that my amplifier has a gain which is substantially unity.

If the input and output voltages of the circuit are, respectively $e_i$ and $e_o$ and the current flowing in the circuit is $i_p$, the expressions for the respective grid voltages of the tubes may be written as follows:

(1) $e_{gk1}=-i_pR_k$ (2) $e_{gk2}=-i_p(r_{p1}+R_k)+u_1e_{gk1}$ (3) $e_{gk3}=-i_p(r_{p1}+r_{p2}+R_k)+u_1e_{gk1}+u_2e_{gk2}$ (4) $e_{gk4}=e_i-e_o$ (5) $e_{gk5}=-i_p r_{p4}+u_4e_{gk4}$ (6) $e_{gk6}=-i_p r_{p5}+u_5e_{gk5}$ (7) $e_{gk7}=-i_p r_{p6}+u_6e_{gk6}$

Similarly the output voltage $e_o$ may be expressed as:

(8) $e_o=i_p(R_k+r_{p1}+r_{p2}+r_{p3})-u_1e_{gk1}-u_2e_{gk2}-u_3e_{gk3}$ or (9) $e_o=-i_p(r_{p4}+r_{p5}+r_{p6}+r_{p7})+u_4e_{gk4}+u_5e_{gk5}+u_6e_{gk6}+u_7e_{gk7}$

Substituting the expressions for the grid voltages given by Equations 1 to 7 in Equations 8 and 9 and solving for the ratio of the ouput voltage to the input voltage, I obtain:

(10)

$$\frac{e_o}{e_i}=\frac{u_4(1+u_5+u_5u_6+u_5u_6u_7)}{1+u_4(1+u_5+u_5u_6+u_5u_6u_7)+\frac{r_{p4}(1+u_5+u_5u_6+u_5u_6u_7)+r_{p5}(1+u_6+u_6u_7)+r_{p6}(1+u_7)+r_{p7}}{R_k(1+u_1)(1+u_2)(1+u_3)+r_{p1}(1+u_2)(1+u_3)+r_{p2}(1+u_3)+r_{p3}}}$$

Let:

$u_{cf}=u_4$, which is the amplification factor of the cathode follower tube.

$r_{pcf}=r_{p4}$, which is the plate resistance of the cathode follower tube.

$u$=the amplification factor of each of the constant voltage and constant current tubes.

$r_p$=the plate resistance of each of the constant voltage and constant current tubes.

If $m$ is the number of constant voltage tubes and $n$ is the number of constant current tubes, the general equation for the gain of my amplifier circuit will be:

(11)

$$\frac{e_0}{e_i}=\frac{u_{cf}\sum_{x=0}^{x=m}u^x}{1+u_{cf}\sum_{x=0}^{x=m}u^x+\dfrac{r_{pcf}\sum_{x=0}^{x=m}u^x+r_p\sum_{x=0}^{x=m}(m-x)(u)^x}{R_k(1+u)^n+r_p\sum_{x=0}^{x=n-1}(1+u)^x}}$$

By using Equation 11 and assuming the values of $u$, $r_p$, and $R_k$ to be 30, 50,000 ohms, and 300,000 ohms, respectively, the amplifier gain may be calculated to be 0.9999987. The actual gain of a circuit similar to that illustrated in Figure 1 was determined by measuring the variation in the difference between the input and output voltages as the input voltage was varied. This variation was about eight parts per million of the input voltage. The gain being equal to one minus this variation was therefore 0.999992.

While I have shown and described my amplifier as including three constant voltage tubes and three constant current tubes, it will be appreciated that a lesser or greater number of tubes may be employed as desired. The greater the number of tubes, the closer the over-all gain approaches unity. My amplifier may readily be converted to alternating current rather than direct current operation merely by replacing batteries 106, 108, and 112 with condensers and appropriate independent voltage dividers between terminal 90 and ground.

In operation, the input signal is impressed on terminals 24 and 26 and is fed to the control grid 12 of tube 10 by the compensating circuit including tubes 18 and 20. Assuming a slight increase in the input signal to grid 12, tube 10 tends to draw an increased plate current. This increase in plate current results in a rise in the potential across cathode resistor 46. It will be remembered that tube 62 maintains the sum $e_g$ of the voltage $e_k$ across resistor 46 and the grid-to-cathode voltage $e_{gk1}$ constant. Consequently, the rise in potential across resistor 46 has the effect of lowering the grid-to-cathode potential of tube 42. This lowering of the grid-to-cathode potential of tube 42 reduces the amount of current which can be passed by tube 42. It will be appreciated that tube 42 thus limits the plate current which can be drawn by tube 10 and serves to maintain it constant. Tubes 38 and 40 operate similarly and assist in this operation.

When a slight increase in the input signal to grid 12 occurs, the voltage at cathode 44 rises. The channel including battery 106 impresses an equal increment of voltage upon grid 104, causing the voltage at cathode 92 to increase a corresponding amount. Since plate 88 is at the potential level of cathode 92, the variation of grid potential from an input signal does not cause a substantial change in the plate-to-cathode potential of tube 10. Tubes 84 and 86 assist in this operation. Since the plate current through tube 10 and the plate-to-cathode voltage of tube 10 are maintained substantially constant, the tube operates in the neighborhood of a single point on a load line drawn on the tube characteristics. The tube has a gain which is substantially unity. Incremental changes in the input tube control grid 12 are, as explained hereinbefore, reflected at the output terminals 120 and 122 of the circuit. Consequently, the output signal is very nearly identical with the input signal. The compensating circuit including tubes 18 and 20 produces a voltage across divider 16 which modifies the input signal in accordance with variations in cathode emission resulting from changes in filament temperature.

It will be seen that I have accomplished the objects of my invention. I have provided an amplifier circuit which is substantially unity. My amplifier is arranged to operate substantially at one point on the load line drawn on the tube operating characteristics. As a result, the distortion resulting from the nonlinearity of tube characteristics is substantially eliminated. My amplifier has an extremely high input resistance and a low output impedance. It may be employed as an isolator. The amplifier may also be used to provide an extremely accurate sawtooth in a linear sweep generator.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A unity gain amplifier including in combination an electron tube having a plate circuit and a grid circuit and a cathode circuit, means for applying an input signal to the grid circuit of said electron tube, means including a constant current tube connected in said cathode circuit for maintaining the current drawn by said electron tube substantially constant, means including a constant voltage tube having a plate and a grid and a cathode connected in said plate circuit to maintain the plate to cathode voltage of said electron tube substantially constant whereby said electron tube produces an output signal which is essentially the same as said input signal, a source of plate potential, means for applying said plate potential to the plate of said constant voltage tube, a freely floating two-terminal source of substantially constant bias voltage independent of signal frequency and independent of any resistive connection to any fixed source of potential, and means connecting the terminals of said bias voltage source respectively directly to said grid of the constant voltage tube and directly to said cathode circuit of said electron tube whereby said bias source contributes substantially no current to said constant current tube.

2. A unity gain amplifier including in combination an electron tube having a plate circuit and a grid circuit and a cathode circuit, said cathode circuit including a cathode resistor and a constant current tube having a control grid and a cathode for maintaining the current drawn by said electron tube substantially constant, means connecting said constant current tube and said cathode resistor in series with said electron tube cathode, a voltage regulator device connected between said constant current tube control grid and the terminal of said cathode resistor remote from said constant current tube cathode for maintaining the sum of the control grid to cathode potential of said constant current tube and the potential across said cathode resistor constant, means including a constant voltage tube having a plate and a control grid, means connecting said constant voltage tube in the plate circuit of said electron tube to maintain the plate to cathode voltage of said electron tube substantially constant whereby said electron tube produces an output signal which is substantially the same as said input signal, a source of plate potential, means connecting said plate potential source to said constant voltage tube plate, a freely floating two-terminal source of substantially constant bias voltage independent of signal frequency and independent of any resistive connection to any fixed source of potential and means connecting the respective terminals of said bias voltage source directly to said constant voltage tube grid and directly to said electron tube cathode circuit whereby said bias source contributes substantially no current to said constant current tube.

3. A unity gain amplifier including in combination an electron tube having a plate circuit and a grid circuit and a cathode circuit, means for applying an input signal to the grid circuit of said electron tube, means including a constant current tube connected in said cathode circuit for maintaining the current drawn by said electron tube substantially constant, means including a constant voltage tube having a plate and a grid and a cathode connected in said plate circuit to maintain the plate to cathode voltage of said electron tube substantially constant whereby said electron tube produces an output signal which is essentially the same as said input signal, a source of plate potential, means for applying said plate potential to the plate of said constant voltage tube, a freely floating two-terminal source of substantially constant bias voltage independent of signal frequency and independent of any resistive connection to any fixed source of potential, means connecting the terminals of said bias voltage source respectively directly to said grid of the constant voltage tube and directly to said cathode circuit of said electron tube whereby said bias source contributes substantially no current to said constant current tube, said electron tube and said constant voltage and said constant current tubes being supplied with the same filament voltage, said input signal-applying means comprising means responsive to variations in said filament voltage for varying the input signal to compensate for filament voltage variations.

4. An amplifier as in claim 3 in which said means responsive to changes in filament voltage comprises a second electron tube supplied with said filament voltage for producing a current in response to changes in filament voltage, a voltage-dividing resistor, means connecting said voltage-dividing resistor to carry said second electron tube current, and adjustable tap on said voltage-dividing resistor and means connecting said tap in said grid circuit of said electron tube to which said input signal is applied.

References Cited in the file of this patent

UNITED STATES PATENTS

| | | |
|---|---|---|
| 2,423,931 | Etters | July 15, 1947 |
| 2,592,193 | Saunders | Apr. 8, 1952 |
| 2,613,286 | Hare | Oct. 7, 1952 |
| 2,679,556 | Fredrick | May 25, 1954 |
| 2,734,944 | Green et al. | Feb. 14, 1956 |
| 2,795,654 | Macdonald | June 11, 1957 |